United States Patent
Miller et al.

(10) Patent No.: US 9,677,323 B2
(45) Date of Patent: Jun. 13, 2017

(54) STATIC PLASMA GRID EVACUATION TECHNIQUES FOR VACUUM INSULATING GLASS (VIG) UNITS

(75) Inventors: Robert A. Miller, Sylvania, OH (US); Ryan L. Dear, Huntertown, IN (US); Jeffrey A. Jones, Ann Arbor, MI (US)

(73) Assignee: Guardian Industries Corp., Auburn Hills, MI (US)

(*) Notice: Subject to any disclaimer, the term of this patent is extended or adjusted under 35 U.S.C. 154(b) by 995 days.

(21) Appl. No.: 13/149,085

(22) Filed: May 31, 2011

(65) Prior Publication Data
US 2012/0304696 A1  Dec. 6, 2012

(51) Int. Cl.
*C03C 27/06* (2006.01)
*E06B 3/677* (2006.01)

(52) U.S. Cl.
CPC ............ *E06B 3/6775* (2013.01); *C03C 27/06* (2013.01); *Y02B 80/24* (2013.01)

(58) Field of Classification Search
CPC ....... C03B 23/20; C03B 23/203; C03C 27/00; C03C 27/06
USPC .............................................. 445/38, 42, 70
See application file for complete search history.

(56) References Cited

U.S. PATENT DOCUMENTS

| | | | |
|---|---|---|---|
| 3,914,000 A | 10/1975 | Beckerman et al. |
| 3,998,510 A | 12/1976 | Salisbury |
| 5,190,703 A | 3/1993 | Rose et al. |
| 5,198,723 A | 3/1993 | Parker |
| 5,657,607 A | 8/1997 | Collins et al. |
| 5,664,395 A | 9/1997 | Collins et al. |
| 5,807,526 A | 9/1998 | Miljevic |
| 5,834,891 A | 11/1998 | Novich |
| 5,855,638 A | 1/1999 | Demars |
| 5,891,536 A | 4/1999 | Collins et al. |
| 5,897,927 A | 4/1999 | Tsai et al. |
| 5,902,652 A | 5/1999 | Collins et al. |
| 5,964,630 A | 10/1999 | Slusarczuk et al. |
| 6,062,163 A | 5/2000 | Patrick et al. |
| 6,261,652 B1 | 7/2001 | Poix et al. |
| 6,692,600 B2 | 2/2004 | Veerasamy et al. |
| 7,342,361 B2* | 3/2008 | Ellingboe ................ 315/111.21 |
| 2003/0051436 A1* | 3/2003 | Veerasamy et al. ......... 52/786.1 |

* cited by examiner

*Primary Examiner* — Cynthia Szewczyk
(74) *Attorney, Agent, or Firm* — Nixon & Vanderhye P.C.

(57) ABSTRACT

A thermally insulating panel (e.g., vacuum IG window unit) includes first and second opposing substrates spaced apart from one another by a plurality of spacers. A low pressure space is defined between the substrates, and is hermetically sealed off by at least one edge seal. During evacuation of the space, a plasma is ignited within the space via a static grid assembly in order to reduce the time needed to evacuate the space down and/or to help remove debris from within the space to the desired low pressure.

17 Claims, 13 Drawing Sheets

STATIC PLASMA GRID EVACUATION TECHNIQUES FOR VACUUM INSULATING GLASS (VIG) UNITS

Certain example embodiments of this invention relate to vacuum insulating glass (VIG) units, and/or methods of making the same. More particularly, certain example embodiments of this invention relate to plasma-enhanced evacuation techniques for the internal cavity of a VIG unit or thermally insulating panel, wherein the plasma-enhanced evacuation techniques are performed in connection with a static plasma grid or array.

BACKGROUND AND SUMMARY OF EXAMPLE EMBODIMENTS OF THE INVENTION

Vacuum IG units are known in the art. For example, see U.S. Pat. Nos. 5,664,395; 5,657,607; 5,897,927; 5,902,652; and 6,261,652, the disclosures of which are all hereby incorporated herein by reference. See also U.S. Pat. No. 6,692,600, the entire contents of which is hereby incorporated herein by reference.

FIGS. 1-2 illustrate a conventional vacuum IC unit. IG unit 1 includes a pair of spaced apart glass substrates 2 and 3 that enclose an evacuated or low pressure space/cavity 6 therebetween. Glass sheets/substrates 2 and 3 are interconnected by peripheral or edge seal 4 of fused solder glass. An array of support pillars or spacers 5 are provided between the substrates in order to space substrates 2, 3 from one another in order to form the space/cavity 6.

In order to evacuate the space/cavity 6, pump out tube 8 is hermetically sealed by solder glass 9 to an aperture or hole 10, which passes from an interior surface of substrate 2 to the bottom of recess 11 formed in the exterior face of substrate 2. A vacuum pump (not shown in FIGS. 1-2) is attached to pump out tube 8, so that the interior cavity 6 between substrates 2 and 3 can be evacuated (i.e., pumped out) to create low pressure in cavity/space 6. Following evacuation, tube 8 may be melted to seal the vacuum. Optionally, a chemical getter 12 may be included within recess 13.

The interior cavity 6 of the vacuum IG unit is typically evacuated down to a pressure below $10^{-3}$ Torr, and most preferably to a pressure below about $10^{-4}$ Torr of atmospheric pressure. Unfortunately, it typically takes twelve minutes or more in order to evacuate cavity 6 to such a low pressure. This lengthy period of time is sometimes undesirable, as it increases the time of production and ties up the operation of valuable capital-intensive machinery.

Thus, it will be appreciated by those skilled in the art that there is a need for techniques for evacuating a vacuum IG unit that takes less time.

An aspect of certain example embodiments relates to techniques for evacuating a thermally insulating panel such as a vacuum insulating glass (IG) unit, where it takes no more than twelve minutes to evacuate the internal cavity down to a pressure of about $5 \times 10^{-4}$ Torr or less.

Another aspect of certain example embodiments relates to techniques for igniting a plasma within the internal cavity of a thermally insulating panel (e.g., vacuum IG unit) during the evacuation process, in order to speed up and/or improve the process of evacuation.

Another aspect of certain example embodiments relates to injecting a gas (e.g., argon, nitrogen, oxygen, hydrogen, etc.) into the internal cavity of a thermally insulating panel, and thereafter inductively ignite a plasma within the cavity by at least partially ionizing the gas. It has been found that the ignition of this plasma results in a quicker and/or more efficient evacuation of the cavity. Moreover, it has been found that the ignition of such a plasma during the evacuation process results in a final vacuum IG unit that tends to be more stable upon exposure to ultraviolet (UV) light.

Still another aspect of certain example embodiments relates to techniques for igniting a plasma within the cavity of a thermally insulating panel during an evacuation process, by utilizing an electromagnetic wave generating coil located outside of the cavity.

Certain example embodiments provide a method of making a thermally insulating panel, the method comprising providing a plurality of spacers between first and second substrates in order to space the substrates from one another; forming a seal located at least partially between the substrates so as to seal off a space between the substrates; and causing a plasma to be present in at least a portion of the space between the substrates during a process of evacuating the space.

Certain example embodiments of this invention relate to a method of making a vacuum insulating glass (VIG) unit. A VIG unit subassembly is located in close relative proximity to an array of electrodes, with the array of electrodes being organized in a plurality of individually activatable plasma-generating elements that are spaced apart from one another. The VIG unit subassembly includes first and second substrates separated from one another by a plurality of support pillars and an edge seal, with a space being defined between the first and second substrates. Plasmas are caused to be present in at least portions of the space between the substrates by selectively activating the elements before and/or during a process of evacuating the space.

Certain example embodiments of this invention relate to a method of making a vacuum insulating glass (VIG) unit. A VIG unit subassembly is provided, with the VIG unit subassembly including first and second substrates separated from one another by a plurality of support pillars, as well as a pump-out port and an edge seal, wherein a space is defined between the first and second substrates. The VIG unit subassembly is positioned above and/or below a plurality of individually actuatable plasma-generating elements. The plasma-generating elements are selectively actuated so as to cause at least one plasma front to be propagated through the space.

Certain example embodiments of this invention relate to an apparatus in which an array of electrodes are organized in a plurality of individually activatable plasma-generating elements that are spaced apart from one another. A controller is configured to activate the elements in a preprogrammed order. A pump is configured to feed purging gas into, and evacuate air from, a cavity of a VIG unit subassembly fed into the apparatus, with the cavity being at least partially defined by first and second substrates and an edge seal of the VIG unit subassembly. The controller is further configured to cause plasmas to be present in at least portions of the space between the substrates by selectively activating the elements before and/or during evacuating of the space by the pump.

According to certain example embodiments, the elements may be sequentially activated based on the elements' respective distances from a pump-out port provided to the VIG unit subassembly, starting with the element that is farthest from the pump-out port. This sequential activation may be repeated one or more times, e.g., to cause one or more corresponding plasma waves or plasma fronts to propagate through the space towards the pump-out port. When plural plasma fronts are provided, they may be sequential or at substantially the same time (but in different areas of the cavity).

According to certain example embodiments, a gas may be pumped into the space and the plasmas may be ignited thereafter, e.g., so that said igniting causes the plasma to be ignited by at least partially ionizing gas in the space. The gas may include nitrogen, argon, oxygen, and/or the like.

According to certain example embodiments, the plasma-generating elements may be oriented relative to the VIG unit subassembly such that an acute angle is formed between edges of the elements closest to the pump-out port and an adjacent edge of the VIG unit subassembly to which the pump-out port is closest. According to certain example embodiments, the elements may be substantially uniformly spaced apart from one another.

According to certain example embodiments, the individually actuatable plasma-generating elements may be fixed in position relative to VIG unit subassembly.

The features, aspects, advantages, and example embodiments described herein may be combined to realize yet further embodiments.

DETAILED DESCRIPTION OF EXAMPLE EMBODIMENTS OF THE INVENTION

Certain embodiments of this invention relate to a method of making a thermally insulating panel such as a vacuum IG unit. The panel or IG unit includes an array of spacers located between opposing substrates, and an edge seal hermetically sealing opposing peripheral edge portions of the opposing substrates. "Peripheral" and "edge" seals herein do not mean that the seal(s) is/are located at the absolute periphery or edge of the unit, but instead mean that the seal is at least partially located at or near (e.g., within about two inches) an edge of at least one substrate of the unit.

Certain embodiments of this invention utilize the ignition of a plasma within the internal cavity or space of a vacuum IG unit, before and/or during the evacuation process thereof. As will be explained herein, it has unexpectedly been found that the ignition of a plasma within the internal cavity or space quickens the evacuation process so that it can be completed in less time. Additionally, it is believed that the plasma ignited within the cavity functions to help clean interior cavity surfaces so that contaminants removed from such surfaces may be more quickly removed from the cavity via the pump-out or evacuation process. The plasma may be ignited within the cavity via a coil or any other suitable plasma igniting device, which is preferably located at least partially outside of the cavity.

An example process includes igniting a plasma within the space/cavity of the unit between the substrates within a range of optimal pressure, thereby creating an internal source of ultraviolet (UV) emissions that may accelerate outgassing under vacuum. The plasma may be ignited either after or while gas is being injected into the cavity/space. The plasma provides energetic ions in contact with the internal surfaces (e.g., internal substrate surfaces defining the space/cavity) of the unit. Then, the space/cavity is evacuated. This evacuation may be done either while the plasma is still being ignited, or after it has expired. The result is an effectively cleaned vacuum IG unit, with degassed interior surfaces. Moreover, pumping-out to high vacuum (low pressure) has been found to proceed more quickly compared to pumping-out without the plasma treatment.

Figure 2:
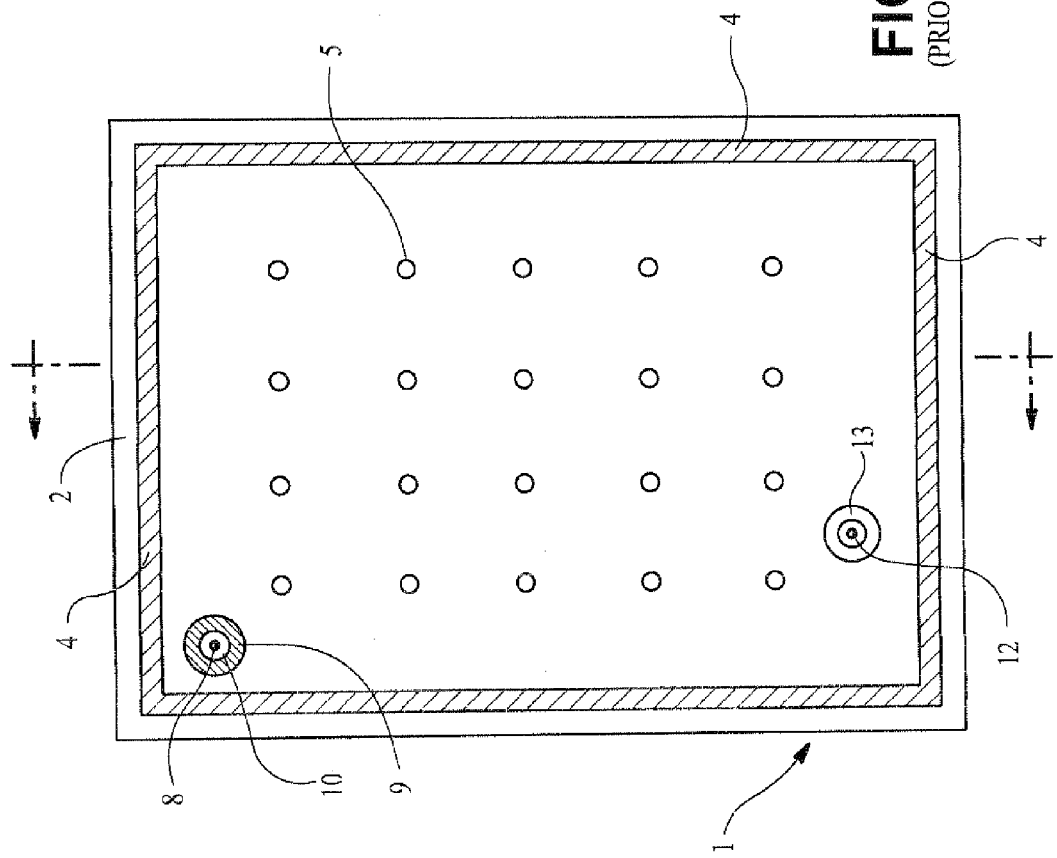
FIG. 2 is a top plan view of the bottom substrate, edge seal, and spacers of the FIG. 1 vacuum IG unit taken along the section line illustrated in FIG. 1.
Figure 1:
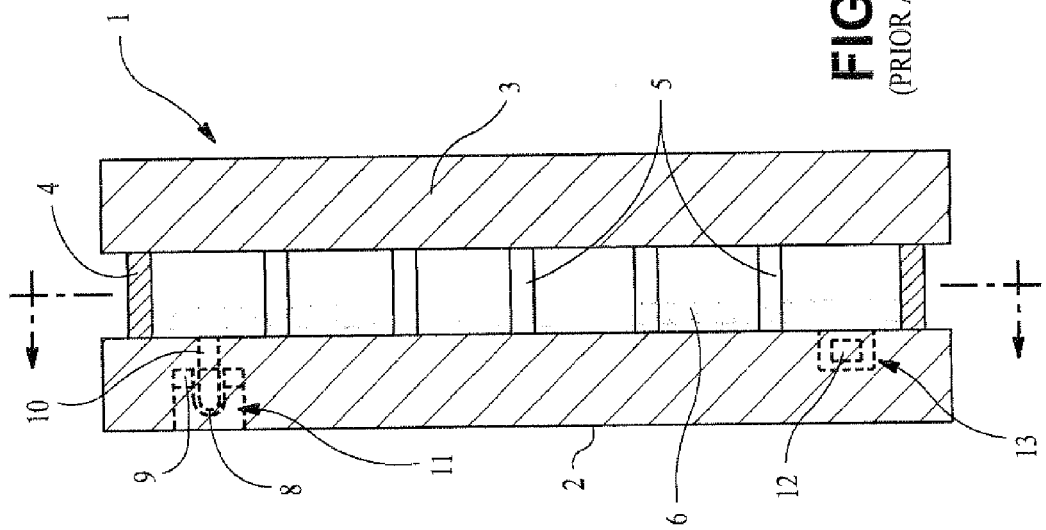
FIG. 1 is a cross-sectional view of a conventional vacuum IG unit.
Figure 3:
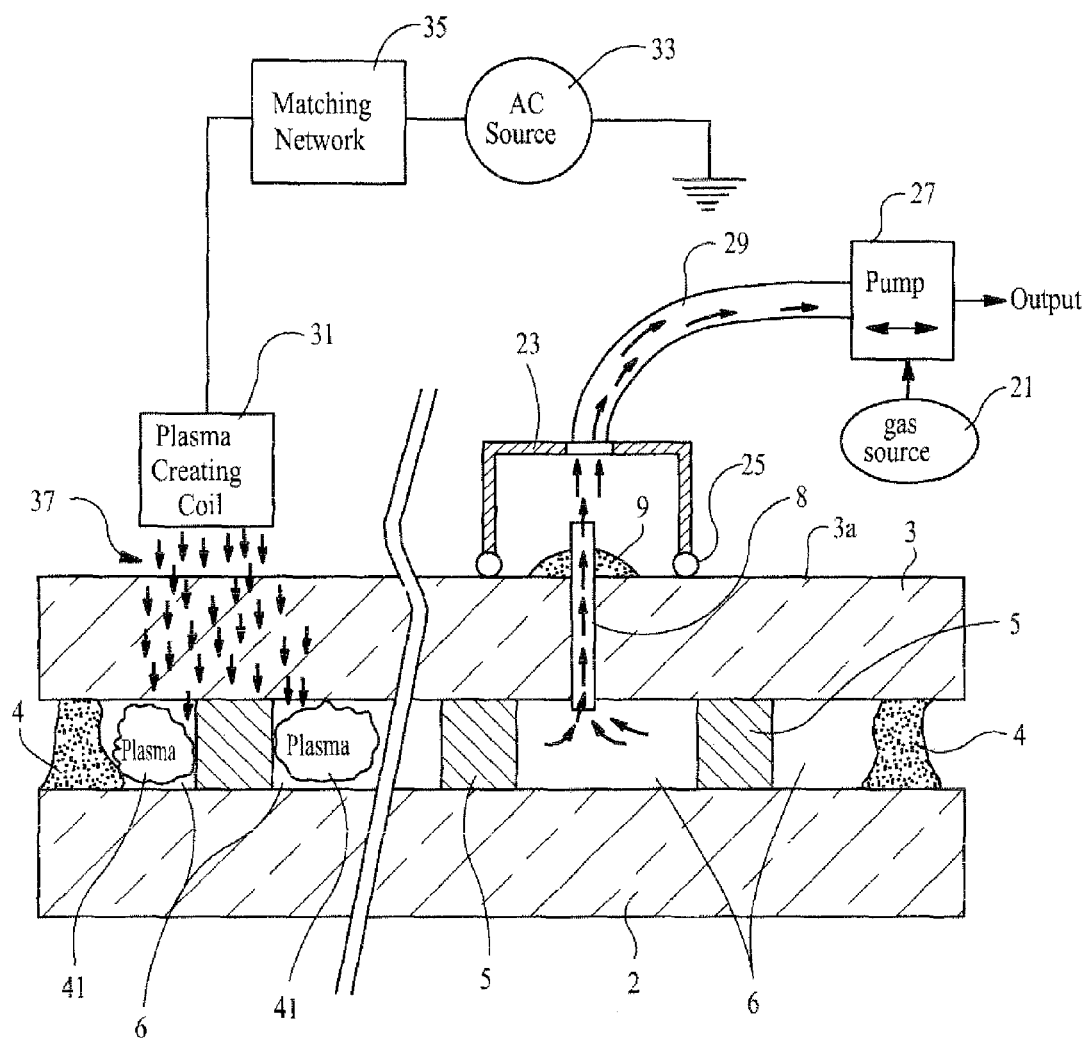
FIG. 3 is a cross-sectional view of a vacuum IG unit being manufactured according to an embodiment of this invention.

Referring now more particularly to the accompanying drawings in which like reference numerals generally indicate like parts throughout the several views, FIG. 3 is a cross-sectional view of a vacuum IG unit being manufactured according to an embodiment of this invention. Because interior cavity or space 6 between the opposing substrates 2, 3 is at a pressure lower than atmospheric in general following the process of manufacture, this type of panel is often referred to as a vacuum insulating glass (IG) unit having low pressure space 6. The vacuum IG unit or panel includes first glass substrate 2, second glass substrate 3, low pressure or evacuated space/cavity 6 provided between the substrates, spacers/pillars 5 for spacing substrates 2 and 3 from one another and supporting them, pump out tube 8 (of metal or glass) for enabling space 6 to be evacuated and/or for enabling purging gas to be pumped into space 6, seal 9 (e.g., of or including solder glass for hermetically sealing tube 8 to the exterior surface 3a of substrate 3, and peripheral or edge seal(s) 4 that hermetically seals low pressure space 6 between substrates 2, 3. Hermetic edge seal 4 substantially prevents any significant amount of air from entering space 6, and substantially maintains the vacuum therein created during the pump-out process. Seal 4 in certain embodiments of this invention may be located in approximately the same location as edge seal 4 shown in FIGS. 1-2. Any other suitable location is possible so long as the low pressure space 6 is sealed off between the substrates. Substrates 2, 3 may be thermally tempered glass, annealed glass, or any other glass in different embodiments of this invention.

In certain embodiments of this invention, substrates 2 and 3 may be approximately the same size. However, in other embodiments, one glass substrate 2 may be larger in size than the other glass substrate 3 in order to provide an approximately L-shaped step proximate an edge of the vacuum IG unit.

Vacuum IG units according to different embodiments of this invention may be used as residential or commercial windows. The evacuation of space 6 eliminates or reduces heat transport between substrates 2, 3 due to gaseous conduction and convection. In addition, radiative heat transport between substrates 2 and 3 can be reduced to a rather low level by providing an optional low emissivity (low-E) coating (not shown) on the internal surface of one or both substrates 2, 3. Such low-E coatings are typically edge deleted under edge seals 4, but need not be in certain embodiments of this invention. High levels of thermal insulation can thus be achieved.

In certain embodiments of this invention, the pressure in space 6 is reduced by way of an evacuation process to a level below about $10^{-2}$ Torr, more preferably below about $10^{-3}$ Torr, and most preferably below about $5 \times 10^{-4}$ Torr. To maintain such low pressures below atmospheric pressure, substrates 2 and 3 are often hermetically sealed to one another by edge seal 4.

Still referring to FIG. 3, an array of small, high strength support spacers 5 is provided between substrates 2, 3 in order to maintain separation of the approximately parallel substrates against atmospheric pressure. It is often desirable for spacers 5 to be sufficiently small so that they are visibly unobtrusive. In certain embodiments, each spacer 5 may have a height of from about 0.1 to 1.0 mm, more preferably from about 0.2 to 0.4 mm. Spacers 5 may be made of solder glass, glass, ceramic, metal, polymer, or any other suitable material in different embodiments of this invention. Spacers 5 may be cylindrical in shape, round in shape, spherical in shape, dime-shaped, C-shaped, pillow-shaped, or any other suitable shape in different embodiments of this invention.

According to certain embodiments of this invention, the glass used for substrates 2 and 3 may be soda lime silica glass. However, other types of glass, colored or clear, may also be used (e.g., borosilicate glass). Glass substrates 2, 3 may be of from about 1-6 mm thick in certain embodiments, preferably from about 3-5 mm thick each. However, when tempered, the glass substrates may be thinner. In alternative embodiments of this invention, it is possible to utilize plastic substrates 2, 3.

Edge seal 4 may be made of any suitable material, including but not limited to solder glass in different embodiments of this invention. In certain embodiments, edge seal 4 may be cured using microwave energy, infrared radiation, or any other suitable heat source.

In an example process of manufacture, substrate 2 is provided. Then, spacers 5 are located on the bottom substrate 2 and top substrate 3 is brought down over the spacers and bottom substrate. Edge seal material, have been provided on the substrate(s), is then cured so as to form edge seal 4 in order to seal off internal cavity of space 6. Thereafter, it is time to evacuate the internal cavity/space 6.

Figure 4:
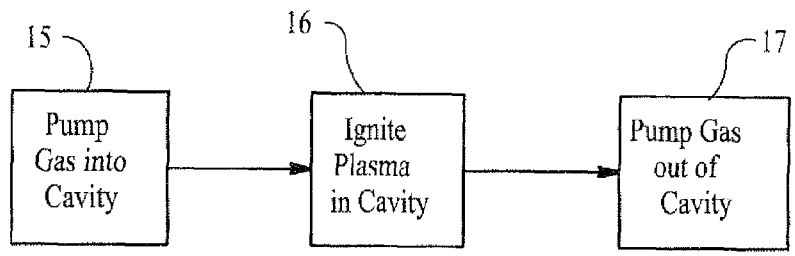
FIG. 4 is a flowchart illustrating certain general steps taken in accordance with an example embodiment of this invention during the manufacture of the FIG. 3 vacuum IG unit.

Referring to FIGS. 3-4, the evacuation process first includes pumping a gas (e.g., nitrogen, argon, oxygen, hydrogen, or the like) into cavity 6 (see step 15 in FIG. 4). Pumping of such gas into the cavity/space 6 is often referred to as purging or backfilling the cavity/space 6 with a gas. After the gas from source 21 has been pumped into the space/cavity 6 via pump 27, a plasma is ignited in the cavity 6 by at least partially ionizing at least part of the gas (see step 16 in FIG. 4). For example, the plasma may ignited when the cavity is at a pressure of from 0.1 to 200 Torr, more preferably from about 1 to 100 Torr, and most preferably from about 1 to 50 Torr. After the plasma has been ignited, gas is pumped out of the cavity 6 during the evacuation process so as to lower pressure in the cavity 6 to the aforesaid low pressure(s) (see step 17 in FIG. 4).

In greater detail, as shown in FIG. 3, pump-out tube 8 is mounted in substrate 3. The upper portion of pump-out tube 8 is hermetically sealed to the exterior surface 3a of substrate 3 by solder glass seal 9. Housing 23, mounted to the exterior surface 3a of substrate 3 by O-ring 25, functions to seal off an area above the outer end of pump-out tube 8. An aperture in housing 23 communicates with pump 27 via communication line or tube 29. Pump 27 is bi-directional, and may function to either pump gas from source 21 into cavity 6 by way of tube 8, or may function to evacuate cavity 6 via tube 8.

Still referring to FIG. 3, plasma inducing coil 31 is located outside of cavity 6 adjacent the exterior surface 3a of substrate 3. Coil 31 is driven via alternating current (AC) source 33 and matching network 35. Coil 31 may be a Tesla coil in certain embodiments of this invention, but may also be other types of coils or any other suitable device for igniting a plasma in other embodiments. When a Tesla coil 31 is used, it is driven with current/voltage so as to cause the coil 31 to generate electromagnetic waves 37 to be directed through substrate 3 and into cavity 6. These electromagnetic waves 37 generated by coil 31 ignite a plasma 41 within the gas-inclusive cavity 6 (i.e., the plasma is inductively ignited). Plasma 41 is ignited by at least partially ionizing gas that has been pumped into cavity 6 from source 21 during the backfill/purge process.

Reference is now made to the examples set forth below which illustrate how the ignition of plasma 41 within cavity 6 unexpectedly enables the evacuation time to be significantly reduced.

EXAMPLES

Six (6) different examples were carried out in order to illustrate the advantage(s) of igniting plasma 41 within cavity 6. Three comparative examples (comparative Examples 1-3) were performed without igniting a plasma in cavity 6, and three corresponding examples utilizing the same gases were carried out with ignition of plasma 41 in cavity 6 (Examples 4-6). It will be shown below that the examples in which plasma 41 was ignited in the space/cavity 6 (i.e., Examples 4-6) had evacuation times much less than the comparative examples where no plasma was ignited. In all six examples, tube 8 was 6 mm in length, with an inner diameter of 1.65 mm.

Figure 5:
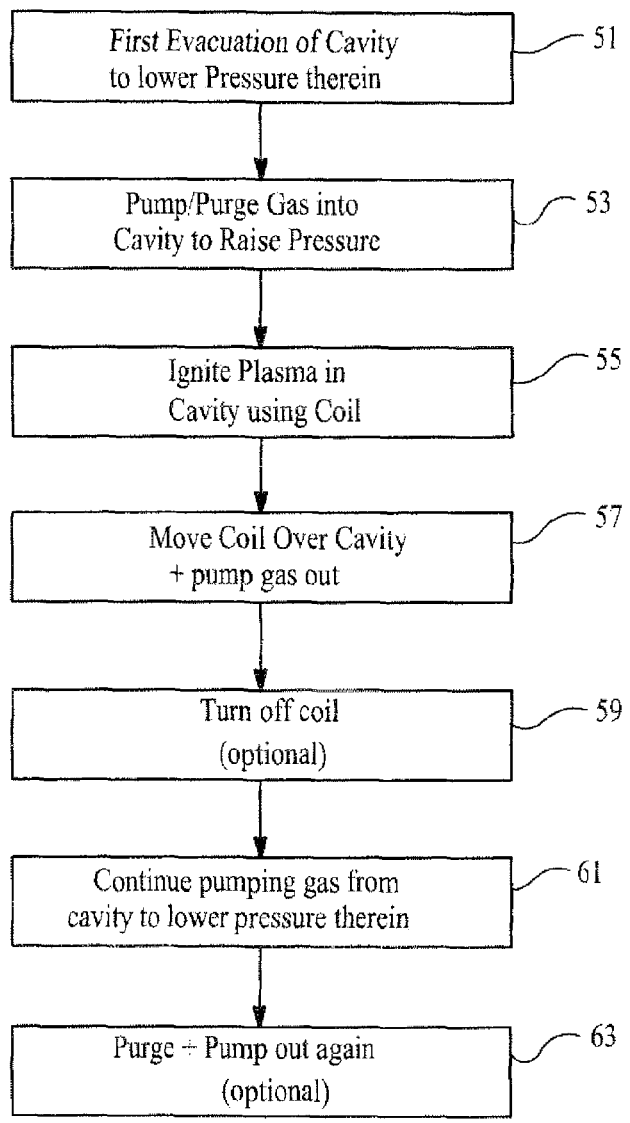
FIG. 5 is a flowchart illustrating in detail certain steps taken in accordance with an example embodiment of this invention during the manufacture of the FIG. 3 vacuum IG unit.
Figure 6:
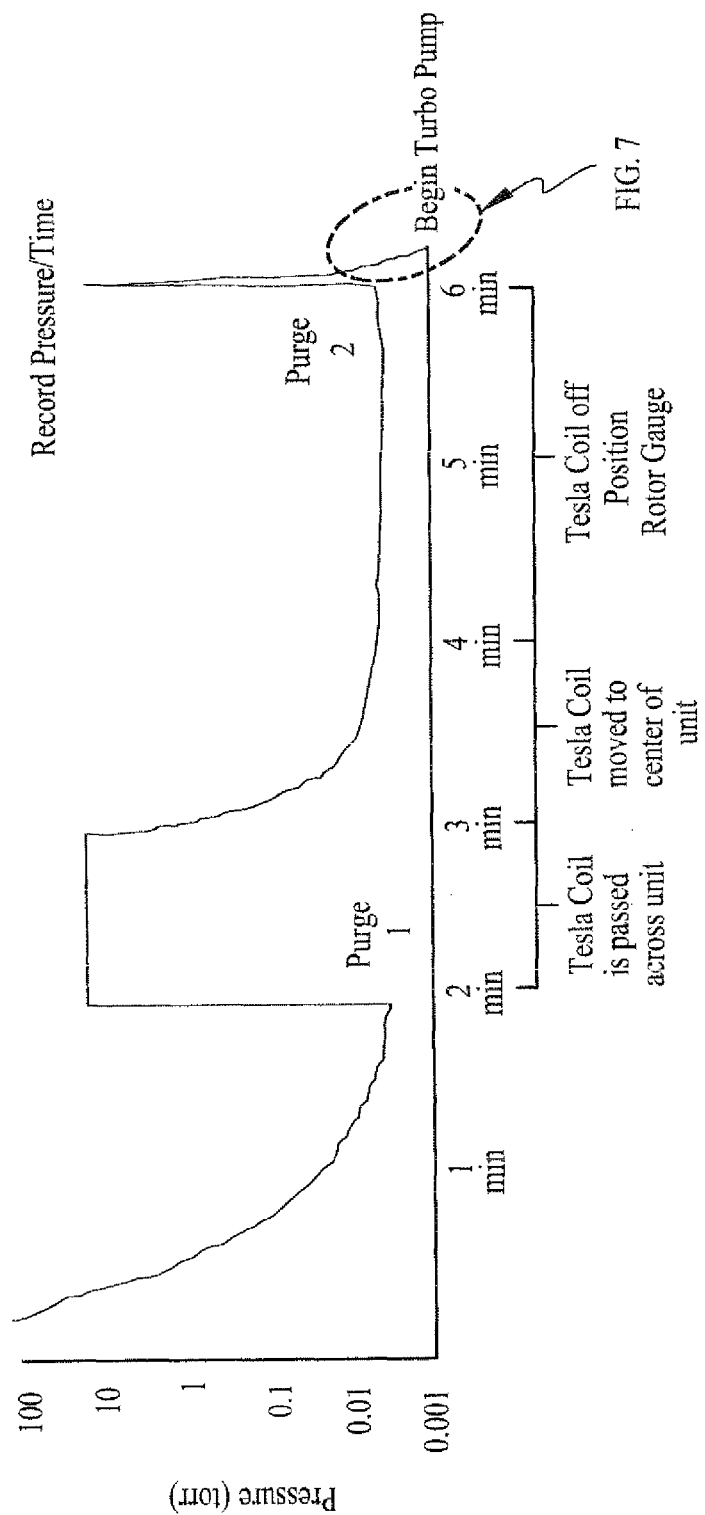
FIG. 6 is a pressure (Torr) vs. time (minutes) graph illustrating how vacuum IG units were evacuated in six different examples presented herein.
Figure 7:
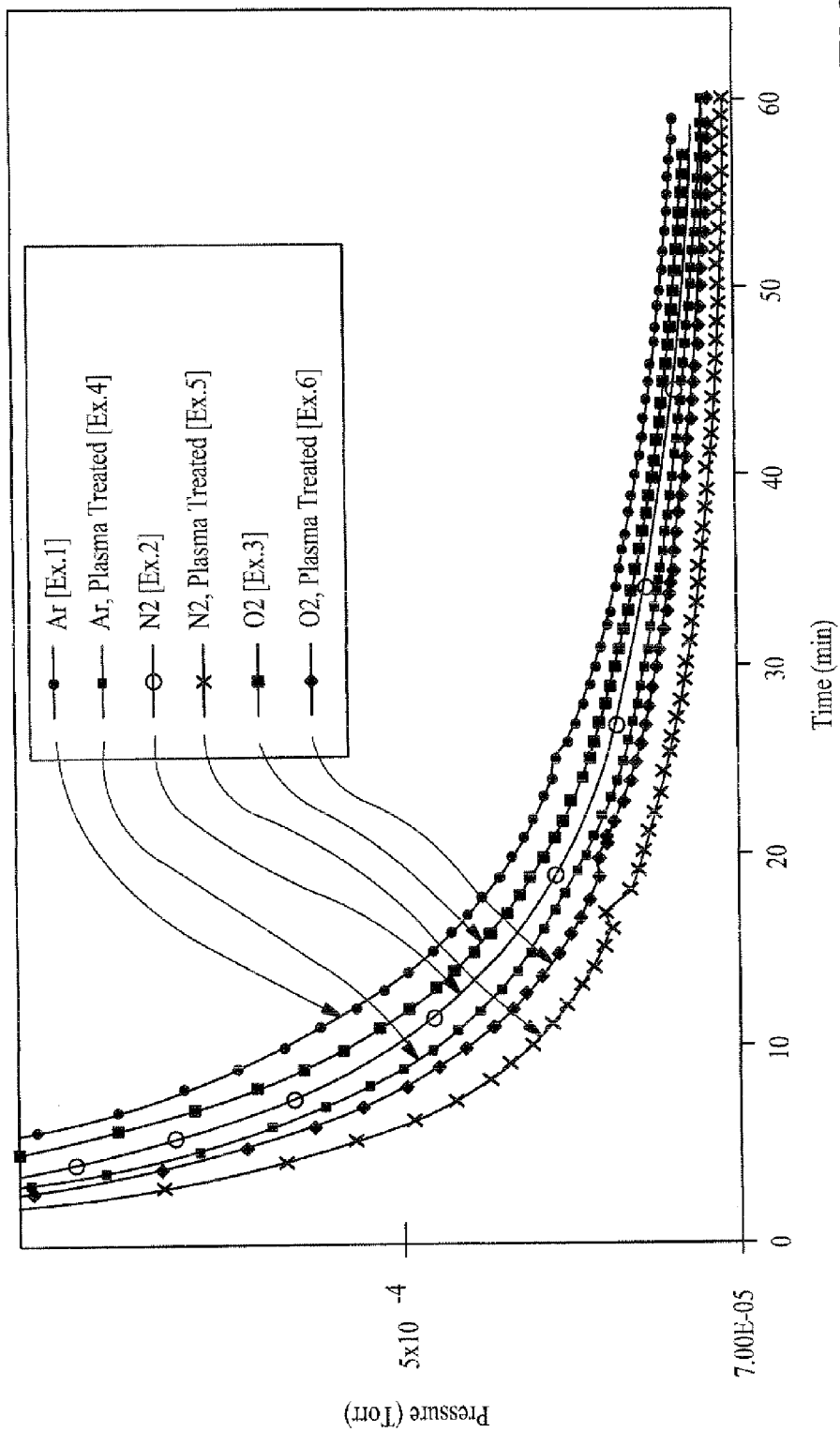
FIG. 7 is a pressure (Torr.) vs. time (minutes) graph of the end portion of the FIG. 6 graph, illustrating evacuation times associated with the six examples presented herein.
Figure 8:
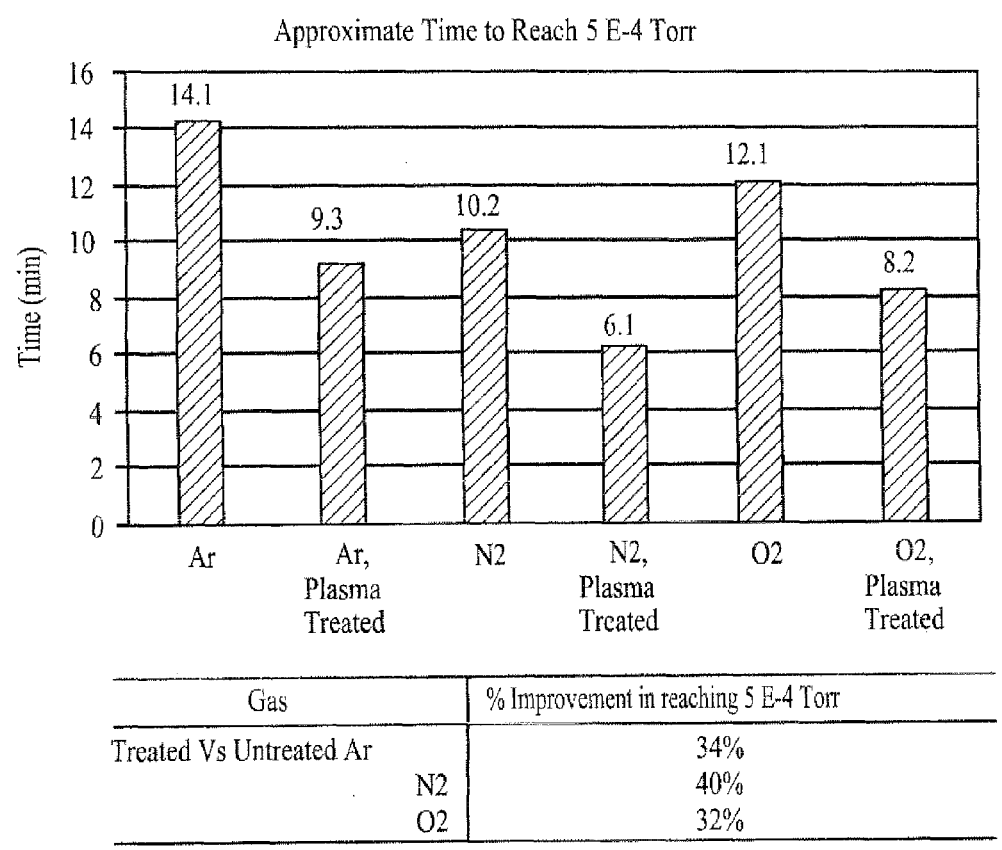
FIG. 8 is a comparative graph illustrating the time taken in order to evacuate a vacuum IG unit to a pressure of $5 \times 10^{-4}$ Torr according to the six examples illustrated in FIGS. 6-7.

FIG. 5 illustrates certain steps carried out in the three examples in which plasma was ignited (i.e., Examples 4-6), while FIGS. 6-8 are also illustrative of the examples.

Examples 1-3 were performed for comparative purposes only. In Example 1, cavity 6 was twice purged with argon (Ar) gas and thereafter evacuated to the pressures shown in FIGS. 7-8. In Example 2, cavity 6 was twice purged with nitrogen (N) gas, and thereafter evacuated to the pressure(s) shown in FIGS. 7-8. In Example 3, cavity 6 was twice purged with oxygen (O) gas, and thereafter evacuated to the pressure(s) shown in FIGS. 7-8. No plasma was ignited in any of Examples 1-3. FIG. 6 illustrates the first and second gas purgings, and the final evacuation carried out in each of Examples 1-3 (except that no plasma was ignited and thus no coil used). FIG. 7 focuses on the evacuation time frame of the first three examples, after about the 4-5 minute mark.

As illustrated in FIG. 8, in Example 1 where only Ar gas was used (no plasma), it took 14.1 minutes to evacuate cavity 6 down to a pressure of $5 \times 10^{-4}$ Torr. In Example 2, where only nitrogen (N) gas was used (no plasma), it took 10.2 minutes to evacuate space/cavity 6 down to $5 \times 10^{-4}$ Torr. Finally, in Example 3 where only oxygen (O) gas was used (no plasma), it took 12.1 minutes to evacuate cavity 6 down to $5 \times 10^{-4}$ Torr.

Examples 4-6 were carried out in accordance with different embodiments of the instant invention. In other words, plasma 41 was ignited in cavity 6 in each of Examples 4-6. Steps taken in Examples 4-6 are shown in FIGS. 5-8.

Examples 4-6 were performed in identical manners, except that argon (Ar) gas was used in Example 4, nitrogen (N) gas in Example 5, and oxygen (O) gas in Example 6. Plasma excitation/ignition was present in each of Examples 4-6. Referring to FIGS. 3 and 5-6, pump 27 was first operated for about two minutes in order to lower the pressure in cavity 6 to about 0.01 Torr (see step 51 in FIG. 5). Then, in a first gas purge (see purge one in FIG. 6), gas from source 21 was pumped via pump 27 and tube 8 into cavity 6 until the pressure therein was raised to about 10 Torr at the two minute mark in FIG. 6 (step 53 in FIG. 5). Following step 53, plasma 41 was ignited in gas inclusive cavity 6 using a Tesla coil 31 (step 55 in FIG. 5). The particular Tesla coil used emits about 50,000 volts at full power, which is what was used for Examples 4-6. Thereafter, at about the two and one-half minute mark (see FIG. 6), coil 31 was moved across the vacuum IG unit (i.e., the coil was moved over cavity 6), and then at about the three minute mark (see FIG. 6) pump 27 was again turned on in an evacuating manner (step 57 in FIG. 5). Continuing with moving of coil 31, the coil was moved to approximately the center of the vacuum IG unit at about the three and one-half minute mark (see FIG. 6). Pumping out continued from the three minute mark until about the six minute mark (see FIG. 6). However, at the five minute mark, the coil 31 was removed and a spirotorr rotor gauge tube was attached to the vacuum IG unit in order to monitor internal pressure. (Step 59 in FIG. 5). As shown in FIG. 6, after the coil 31 was removed, pumping continued until the six minute mark (step 61 in FIG. 5). Them, at the six minute mark, gas from source 21 was again pumped into cavity 6 in a second purge (see FIG. 6 and step 63 in FIG. 5). Following this optional second gas purge shown in FIG. 6, pump 27 was switched back to an evacuating state so as to evacuate cavity 6 down to the pressures shown in FIGS. 7-8 via a turbo-pump (with or without plasma 41 ignition in the cavity 6).

Referring to FIGS. 7-8, in Example 4 where plasma ignition was combined with argon (Ar) gas, it took 9.3 minutes to evacuate cavity 6 down to a pressure of $5 \times 10^{-4}$ Torr. This is almost five minutes less than with argon (Ar) gas not excited with plasma (compare Example 4 to Example 1). In a similar manner, in Example 5 where nitrogen (N) gas was combined with plasma ignition, it took only 6.1 minutes to evacuate cavity 6 down to a pressure of $5 \times 10^{-4}$ Torr. This is almost four minutes less than with nitrogen gas and no plasma (compare Example 5 to Example 2). Finally, in Example 6 where oxygen (O) gas was combined with plasma ignition, it took only 8.2 minutes to evacuate cavity 6 down to a pressure of $5 \times 10^{-4}$ Torr. This is almost four minutes less than with oxygen gas and no plasma (compare Example 6 to Example 3). Clearly, it can be seen from the above that the ignition of plasma 41 in cavity 6 during the evacuation process significantly reduces the time needed to evacuate the cavity 6 down to a desired low pressure. The 34% improvement for argon gas, 40% improvement for nitrogen gas, and 32% improvement for oxygen gas (with plasma ignition) are shown at the bottom of FIG. 8.

In Examples 4-6, in step 57 where coil 31 was moved across the IG unit, the coil started at the corner of the unit furthest from pump-out tube 8, and moved diagonally across the unit toward the same. This method of movement is provided for purposes of example only and is not intended to be limiting. In fact, coil 31 may or may not be moved across the VIG unit in different embodiments of this invention, during the evacuation process.

It can be seen from the above that the use of nitrogen gas (as opposed to argon or oxygen) when combined with plasma ignition results in superior time reduction of the evacuation process (i.e., a lower pressure is achievable more quickly). In this regard, FIG. 8 shows that the use of nitrogen gas instead of oxygen or argon reduces the evacuation time by some 2-3 minutes. This is believed to be a result of the fact that nitrogen has the highest conductance value (followed by oxygen and argon) and a higher molecular mass. However, those skilled in the art will realize that any of these gases may be used in different embodiments of this invention even though the data shows nitrogen to be superior with regard to reduction of evacuation time.

The embodiments discussed above illustrate coil 31 (e.g., Tesla coil) as the structure for inductively igniting plasma 41 within cavity 6. However, the instant invention is not limiting in this regard. For example, other techniques for causing a plasma to be ignited with cavity 5 include electron cyclotron resonance (ECR) for generating a high density plasma, neutral-looped discharge (NLD) for generating plasma by RF fields, or the like. In essence, while it is important that a plasma 41 be ignited within cavity 6, various structures/techniques may be utilized in different embodiments of this invention to ignite such a plasma.

Static Plasma Grid or Array Embodiments

In certain cases, it may be desirable to perform the pump-down within an oven, e.g., to speed the evacuation time, since temperature increases will help adjust the volume of the gas to be evacuated. Cooling rates may then be selected. However, in certain example embodiments of this invention, it is possible to replace such pump-down ovens with simplified insulation boxes where the cooling rate is optimized by selecting the appropriate thermal resistance of the box itself. Certain example embodiments may also simplify plasma cleaning by replacing a stationary or moving mechanical arm with a single plasma creating coil with a static grid of electrodes. In certain instances, the grid of electrodes may be selectively activated or switches to generate a front of plasma that sweeps through the VIG cavity. The grid may be integrated into the insulation box and used as a part of the pump-down process in certain example embodiments. Thus, one the VIG is properly oriented relative to the grid or array of electrodes, plasma energy may be perceives delivered to at least the interior cavity of the VIG unit. Once the grid or array is electrically energized, plasma is propagated within the window unit in an improved, efficient manner for effective and rapid cleaning, e.g., of stray molecules within the cavity. The removal of such stray molecules advantageously may help to provide greater insulating value of the finished unit. The stray molecules, knocked loose or otherwise moved by the plasma, may be swept by the plasma front towards the pump-out port such that the pump-down to vacuum may help remove the molecules from the cavity interior.

Figure 9:
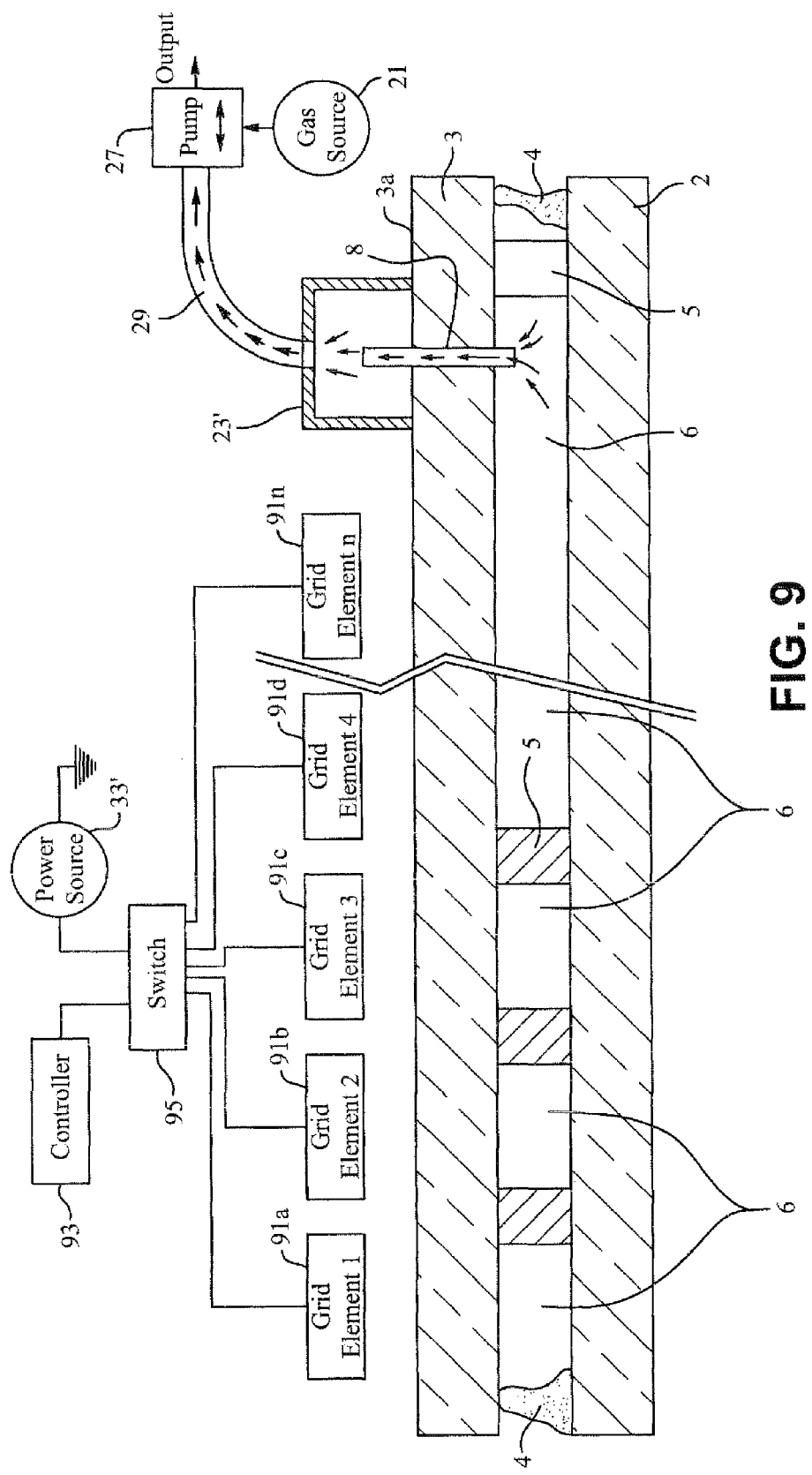
FIG. 9 is a cross-sectional view of a VIG unit being manufactured in connection with a static plasma grid according to an embodiment of this invention.

FIG. 9 is a cross-sectional view of a VIG unit being manufactured in connection with a static plasma grid according to an embodiment of this invention. FIG. 9 is similar to FIG. 3. However, rather than having a single plasma creating coil 31, FIG. 9 includes a plurality of plasma-generating elements 91a-91n in an array-like arrangement.

A plasma generating device including the multiple elements 91a-91n is positioned substantially parallel to the substrates 2 and 3. In the FIG. 9 example embodiment, the VIG subassembly subject to pump down via the pump 27 and the housing 23' is substantially horizontal and, thus, the plasma generating device including the multiple elements 91a-91n is also substantially horizontal. Although the plasma generating device including the multiple elements 91a-91n is located above the VIG subassembly in FIG. 9, it may be located below in different implementations. Furthermore, in certain example embodiments, multiple devices may be provided above and/or below major surfaces of the VIG subassembly.

In any event, as can be seen from FIG. 9, the plasma generating device includes a plurality of grid elements. The elements may be plasma creating electrodes in certain instances, with such electrodes optionally being banked into separate zones that are individually energizable to generate a wave of plasma energy that propagates from one end of the VIG subassembly cavity towards the other. More particularly, a programmable controller operates a switch 95 connected to each of the grid elements 91a-91n in the device. The programmable controller may instruct the switch to selectively power the grid elements 91 individually (e.g., using the power source 33'). For instance, the grid elements 91 may be activated in sequence to create a single plasma front. Multiple plasma fronts also may be created by repeated individual actuation of all grid elements from the elements most remote from the tube 8 and thus the pump-out port to the those closest to the pump-out port 8, and then repeating from the elements most remote from the pump-out port one or more times.

Still further, the controller 93 may generate multiple plasma fronts by actuating multiple grid elements at a single time, e.g., with the same sequential sweeping pattern for each of the different waves as shown and described in connection with FIGS. 11a-11d. For instance, grid element 1 may be initially activated for a first front in a first step, grid element 2 may be sequentially activated in a second step in the first front, grid element 3 may be activated for a third step in the first front at the same time that grid element 1 is activated in a first step for a second front, grid element 4 may be activated for a fourth step in the first front at the same time that grid element 2 is activated in a second step for the second front, etc. Thus, one or more energy waves help sweep stray molecules toward the tube 8 for more efficient cleaning prior to sealing the VIG unit.

Figure 10:
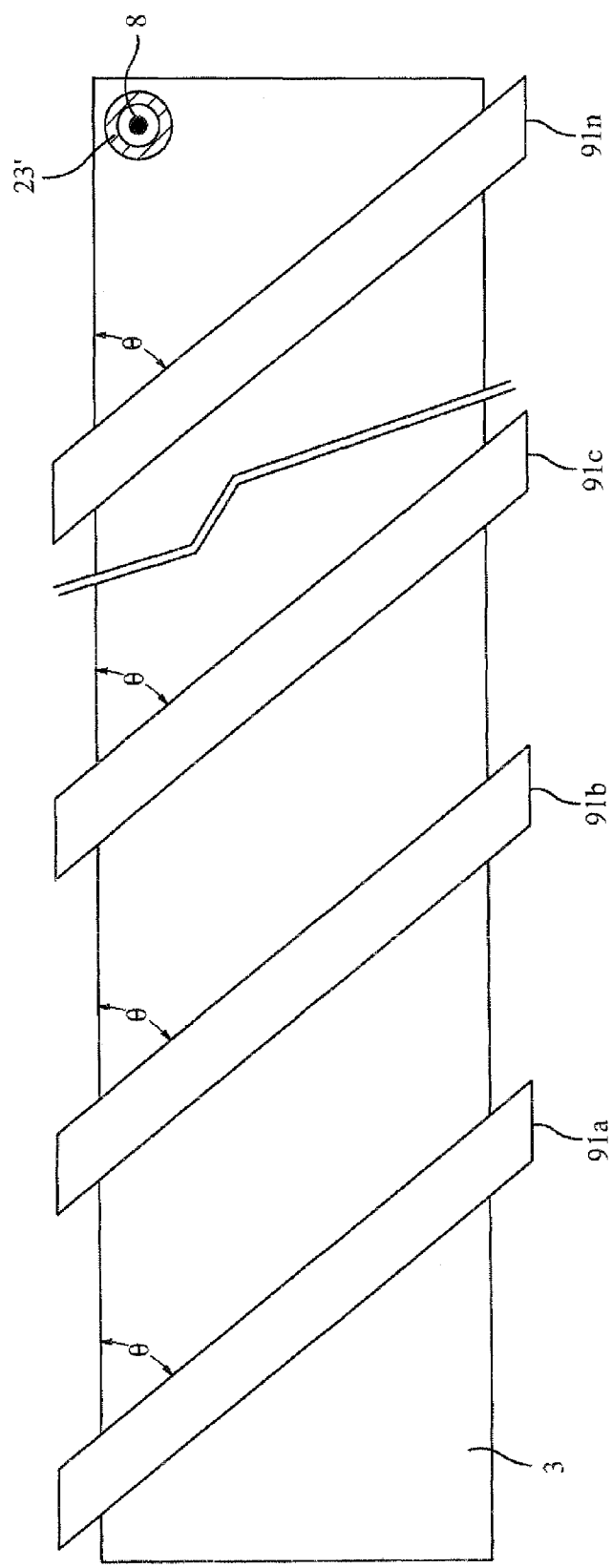
FIG. 10 is an illustrative top plan view of the FIG. 9 example system.

FIG. 10 is an illustrative top plan view of the FIG. 9 example system. As can be seen in FIG. 10, the elements 91a-91n are provided at an angle θ relative to the underlying VIG subassembly. In the FIG. 10 example embodiment, the angle θ is defined by the edge of the elements 91 proximate the pump-out tube 8 and the adjacent edge of the VIG unit subassembly closest the pump-out tube 8 and, as will be appreciated from FIG. 10, angle θ is an acute angle. This angled arrangement may help to move the debris closer to the tube and, thus, out of the cavity. In certain example embodiments, the angle θ is 90 degrees or less, more preferably from about 10-60 degrees, and sometimes from about 20 or 30 degrees to 45 degrees. However, in different embodiments, the angle may be perpendicular to the major edge of the substrate or even obtuse. Of course, it will be appreciated that different angles may be used in different embodiments, e.g., depending for example on the placement of the pump-out tube 8, the dimensions of the VIG unit subassembly, etc. For instance, where the pump-out tube 8 is located on an end of the substrate but in the approximate center of the minor edge, it may be desirable to provide more perpendicular angle for each of the elements. The same angle may be desirable if the pump-out tube 8 is located in the center of the substrate. If the pump-out tube 8 is located elsewhere, multiple angles may be provided for the elements 91. For instance, a chevron-type arrangement may be provided if the pump-out port is located at the center of the top edge or elsewhere.

In certain example embodiments, the elements may be substantially evenly spaced apart, e.g., such that they have a common pitch. In certain example embodiments, one or more elements may be provided on one or both sides. In embodiments where multiple elements are provided on both sides, the pitches may be the same or different. For instance, common pitches may be provided so that the elements on one side of the VIG subassembly are substantially centered between the elements on the opposing side of the VIG subassembly. Waves may be generated by actuating the elements based on the horizontal position relative to the pump-out tube 8, with or without regard to the side. In other words, in certain example embodiments, all elements on the top may be actuated separately from the elements on the bottom, whereas all elements on the top and bottom may be actuated according to their horizontal position in different embodiments of this invention. In example embodiment that involve low-E coatings on one of the substrates, it may be desirable to employ one-sided techniques such that the grid is provided proximate the substrate that does not support the low-E coating.

Figure 11A:
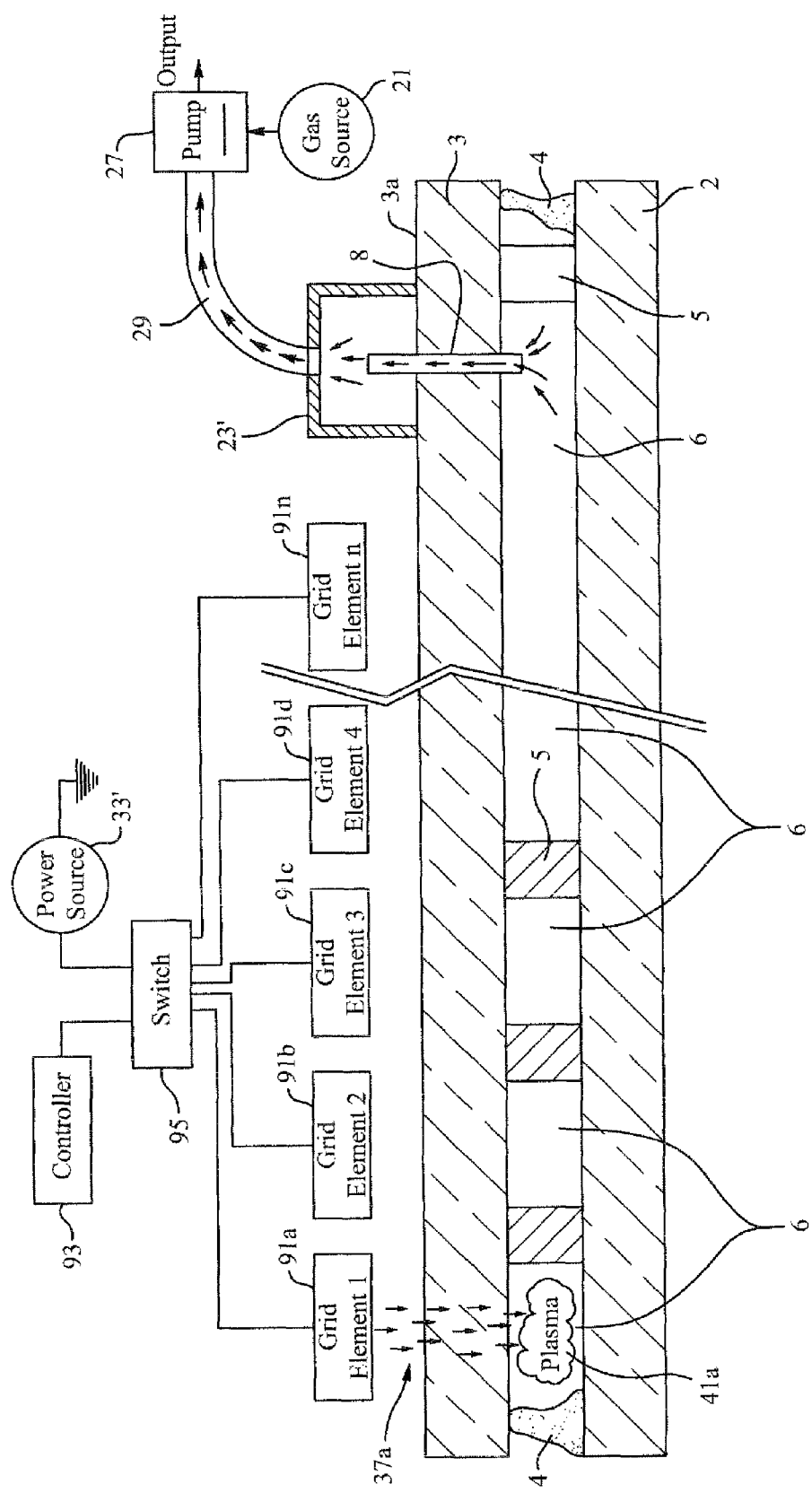
FIGS. 11a-11d demonstrate how the FIG. 9 example system may be made to operate in accordance with an embodiment of this invention.
Figure 11B:
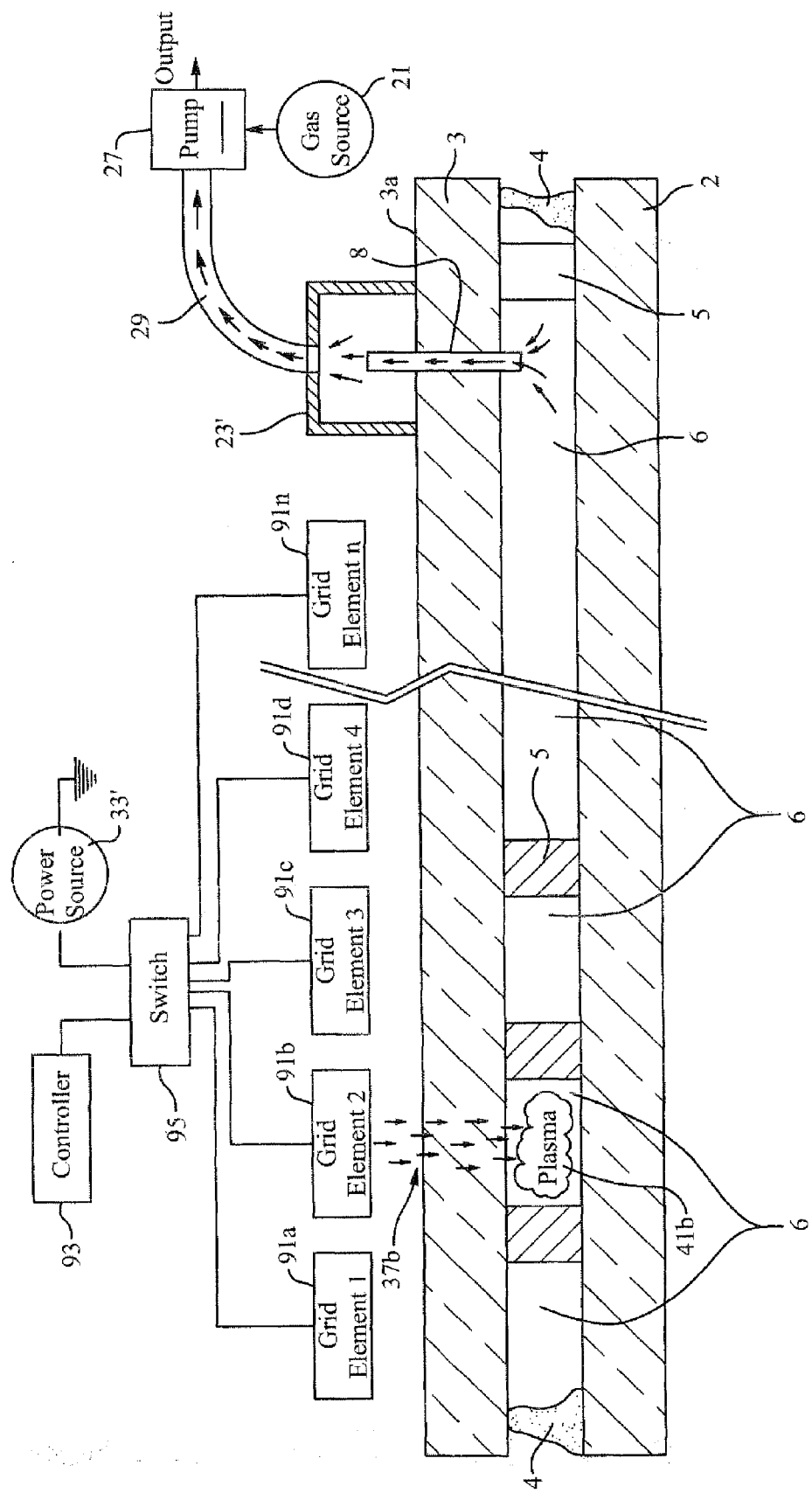

As indicated above, FIGS. 11a-11d demonstrate how the FIG. 9 example system may be made to operate in accordance with an embodiment of this invention. In FIG. 11a, the controller 93 controls the switch 95 such that the first grid element 91a is activated. Waves 37a from the first grid element 91a create a first plasma area 41a within the cavity 6. The first grid element 91a is controlled for a predetermined or preprogrammed amount of time. Then, as shown in FIG. 11b, the controller 93 controls the switch 95 such that the first grid element 91a is deactivated and such that the second grid element 91b is activated. Waves 37b from the second grid element 91b create a second plasma area 41b within the cavity 6. As can be seen, the plasma is being moved closer to pump-out tube 8.

Figure 11C:
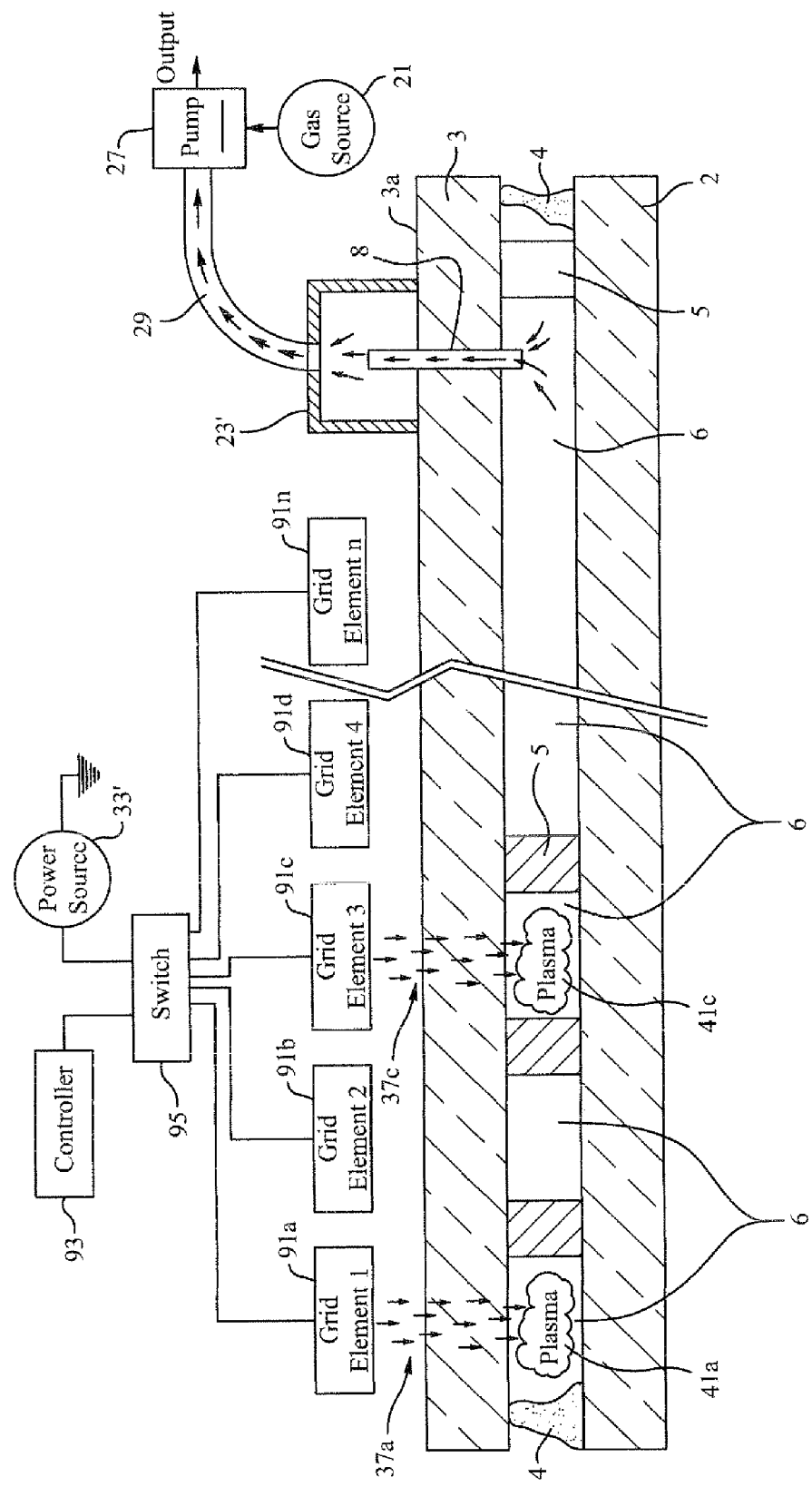
Figure 11D:
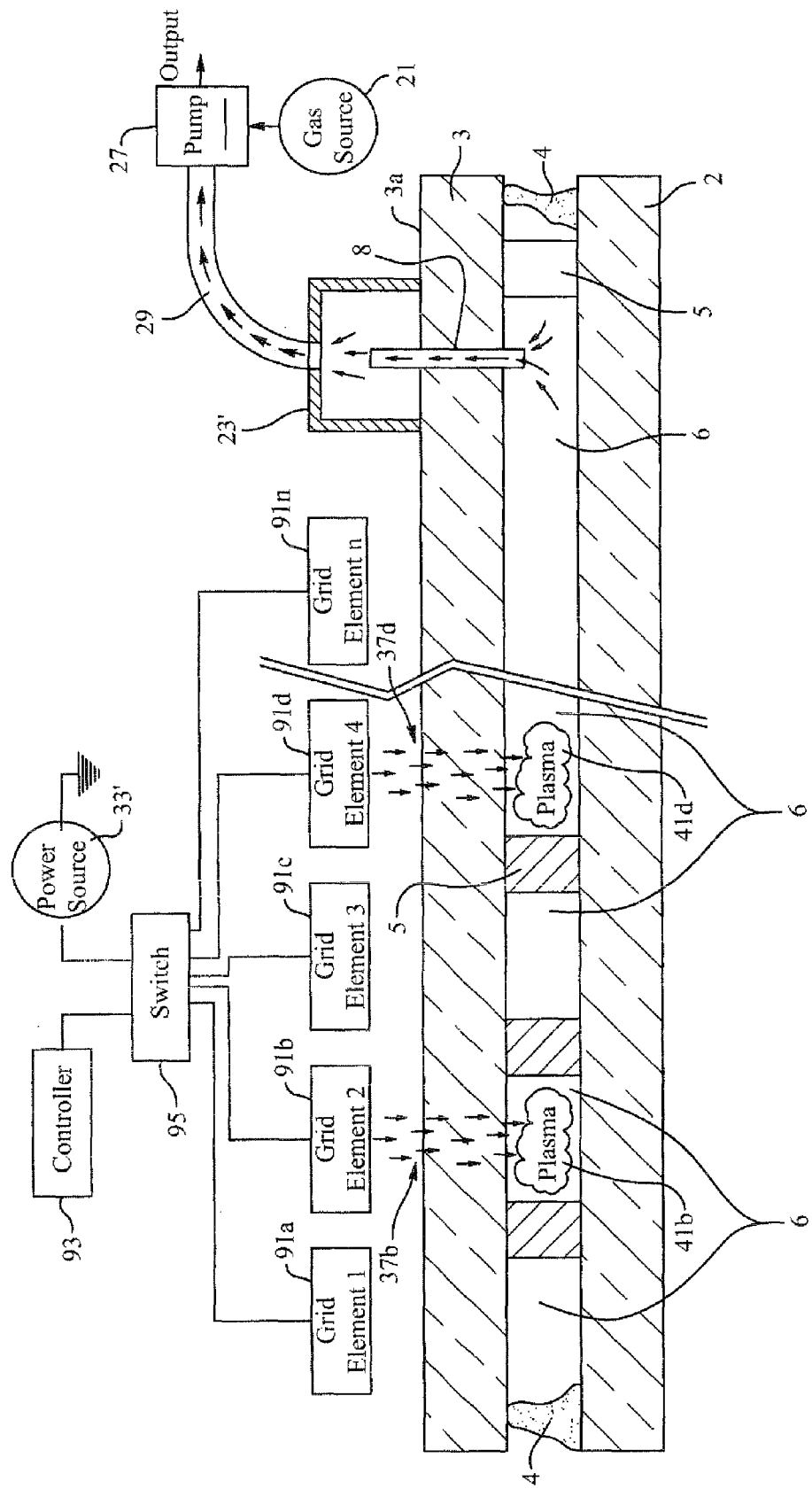

Thus, certain example embodiments may involve the sequential firing of various electrodes or electrode banks, optionally without moving parts (e.g., without moving the individual electrodes or electrode banks). In addition, as also indicated above, the controller 93 may be used to help create multiple plasma fronts that operate at the same or substantially the same time(s). Thus, as shown in FIG. 11c, the controller 93 causes the switch 95 to deactivate the second grid element 91b and to instead activate both third grid element 91c and first grid element 91a. The third grid element 91c, creating the third plasma area 37c, may be viewed as the third progressive step in a first wave front moving towards the pump-out tube 8, whereas the first plasma area 37a may be viewed as the first step in a second wave front moving towards the pump-out tube 8. FIG. 11d shows the next phase in this two wave front example, where the controller 93 causes the switch 95 to deactivate the first grid element 91*a* and the third grid element 91*c* and instead activate the second grid element 91*b* and the fourth grid element 91*d*. The fourth plasma area 37*d* may be viewed as the fourth progressive step in the first wave front moving towards the pump-out tube 8, whereas the second plasma area 37*b* may be viewed as the second progressive step in the second wave front moving towards the pump-out tube 8.

The elements may be made to cycle in this or any other appropriate way with one, two, three, or more wave fronts. Although 5 elements 91*a*-91*n* are shown in and described in connection with FIGS. 9-11*d*, it will be appreciated that more or fewer elements may be provided in different embodiments of this invention. For example, two or more elements may be provided depending on the implementation.

As will be appreciated from the description above, certain example embodiments may leverage a programmable controller to generate customizable wave patterns, e.g., where each wave optionally is rapidly triggerable (e.g., without having to wait until a plasma exciting element is moved into an appropriate position). It also is possible leverage the programmable controller to generate, multiple waves that propagate across the VIG subassembly at a given time, thereby potentially providing improved molecular cleaning within a shorter period of time.

Figure 12A:
FIGS. 12a-12b illustrate two example grid elements according to an embodiment of this invention.
Figure 12B:

FIGS. 12*a*-12*b* illustrate two example grid elements according to an embodiment of this invention. FIG. 12*a* shows a rake-like element that is comparatively rigid. The rake shown in FIG. 12*a* includes a main body with semi-circular cutouts (although other arrangements are possible in different embodiments of this invention). The rake is electrically energized to create plasma energy. Subsequent rakes are energized to create a wave that moves across the VIG subassembly as described above, and the moving boundary of energy pushes molecules out and therefore cleans the unit. The activation of subsequent rakes is an alternative to a single rake mounted for linear actuation, e.g., in which the single rake itself is swept to create a corresponding plasma energy wave that moves with it across the VIG subassembly.

By contrast, FIG. 12*b* is a more broom-like arrangement including plural, densely packed "bristles." As above, the broom is electrically energized to create plasma energy. Subsequent brooms are energized to create a wave that moves across the VIG subassembly as described above, and the moving boundary of energy pushes molecules out and therefore cleans the unit.

Figure 13:
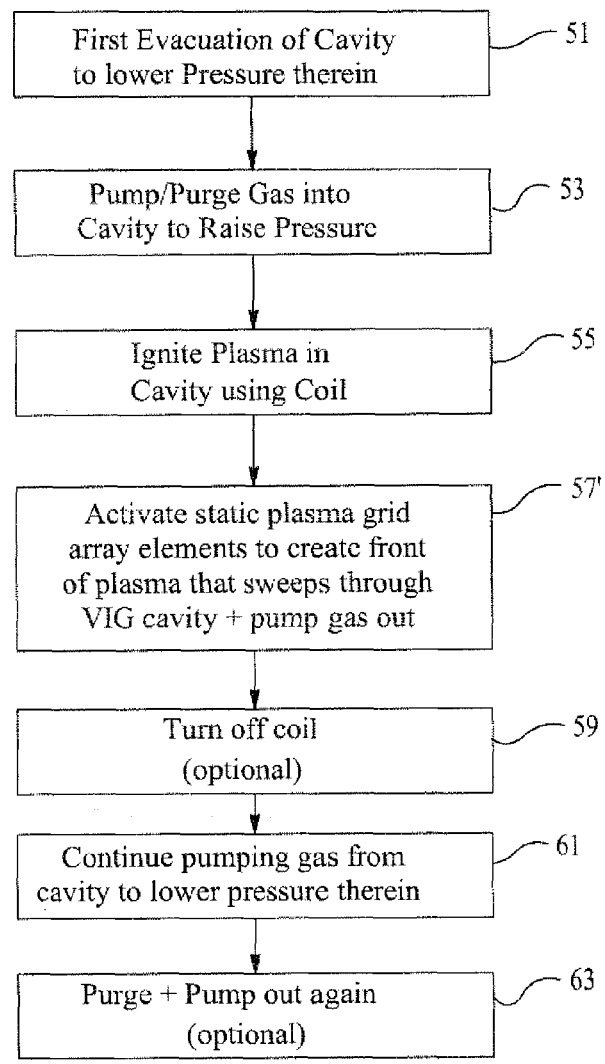
FIG. 13 is a flowchart illustrating in detail certain steps taken in accordance with an example embodiment of this invention during the process shown in FIGS. 11a-11d.

FIG. 13 is a flowchart illustrating in detail certain steps taken in accordance with an example embodiment of this invention during the process shown in FIGS. 11*a*-11*d*. FIG. 13 is similar to FIG. 5. However, in step 57', the static plasma grid array elements are selectively activated to create one or more fronts of plasma that sweep through the VIG cavity, and the gas is also pumped out. The selective activation may be accomplished in connection with a programmable controller as alluded to above. A user, using a user interface, may program the programmable controller to control details including, for example, how many wave fronts should be created, the timing between consecutive wave fronts, how long each element in the grid should be actuated for, the time between activation of adjacent grid elements, whether sensors in the unit should automatically determine the size of the VIG unit subassembly, etc.

The plasma grid techniques of certain example embodiments may be used in a simplified insulation box operable within a broad temperature range, e.g., from about ambient temperature to an elevated temperature of at least about 350 degrees C. For instance, certain example embodiments may operate at 250 degrees C. In certain example embodiments, the plasma process may be used within a vacuum, e.g., from about 0.01 to 250 Torr. As alluded to above, purge gasses or argon, nitrogen, and/or the like, may be used during the processing, e.g., as backfill gasses.

The example plasma grids described herein also may be integrated into the vacuum process ovens on a VIG production line. Regardless of the arrangement, the vacuum oven or insulation box may include multiple vertical levels and may have at least one plasma grid system at each level (e.g., for upper, lower, or upper and/or lower surfaces). In certain example embodiments, the example plasma grids may be mounted within the oven or insulation box and be vertically adjustable to provide clearance, allowing the glass to index into position, as well as to accommodate different glass thicknesses.

The example plasma grids described herein also may be utilized in an in-line process in which the glass indexes beneath the device in certain example embodiments. Depending on the example implementation, the VIG subassembly may be stationary or in motion on a conveyor during plasma cleaning and/or evacuation.

In certain example embodiments, the device may be utilized within a coater-type vacuum chamber in which it is deemed beneficial that a plasma energy wave is formed. The VIG subassembly may be stationary or in motion on a conveyor during plasma cleaning and/or evacuation While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a vacuum insulating glass (VIG) unit, the method comprising:

locating a VIG unit subassembly in close relative proximity to a static grid including an array of substantially linear electrodes, the array of electrodes being organized in a plurality of individually activatable plasma-generating elements that are spaced apart from one another, the VIG unit subassembly including first and second substrates separated from one another by a plurality of support spacers pillars and an edge seal, a space being defined between the first and second substrates, and a pump-out port that communicates with the space; and while the static grid and the VIG unit subassembly are fixed in close relative proximity to one another, causing plasmas to be present in at least portions of the space between the substrates by selectively activating the elements at least during a process of evacuating the space, wherein the electrodes are selectively activated in a sequential manner moving toward the pump-out port so as to cause successive plasma waves to propagate through the space towards the pump-out port, the successive plasma waves in turn causing knocked loose and/or stray molecules to be swept towards the pump-out port for removal during evacuation, wherein the elements are oriented relative to the VIG unit subassembly such that an acute angle is formed between edges of the elements closest to the pump-out port and an adjacent edge of the VIG unit subassembly to which the pump-out port is closest.

2. The method of claim 1, wherein the first and second substrates each comprise glass.

3. The method of claim 1, wherein the selective activating of the elements comprises sequentially activating the elements based on the elements' respective distances from the pump-out port provided to the VIG unit subassembly, starting with the element that is farthest from the pump-out port.

4. The method of claim 3, further comprising repeating the selective activating of the elements at least twice.

5. The method of claim 1, further comprising pumping a gas into the space and thereafter igniting the plasmas, so that said igniting causes the plasma to be ignited by at least partially ionizing gas in the space.

6. The method of claim 1, further comprising pumping a gas into the space and thereafter igniting the plasmas, the gas including at least one of nitrogen, argon, and oxygen.

7. The method of claim 1, wherein the acute angle is from about 30-60 degrees.

8. The method of claim 1, wherein the elements are substantially uniformly spaced apart from one another.

9. The method of claim 1, wherein the grid is integrated into an insulation box used in the process of evacuating the space.

10. A method of making a vacuum insulating glass (VIG) unit, the method comprising:
   providing a VIG unit subassembly including first and second substrates separated from one another by a plurality of support pillars, as well as a pump-out port and an edge seal, wherein a space is defined between the first and second substrates;
   positioning the VIG unit subassembly above and/or below a plurality of individually actuatable plasma-generating elements; and
   selectively actuating multiple of the plasma-generating elements at substantially the same time so as to cause a plurality of plasma waves having respective plasma fronts to be propagated through the space towards the pump-out port,
   wherein the selective actuating of the elements comprises causing at least two successive plasma fronts to propagate through the space towards the pump-out port, and be present in the space, at substantially the same time.

11. The method of claim 10, wherein the individually actuatable plasma-generating elements are fixed in position relative to VIG unit subassembly.

12. The method of claim 10, further comprising sequentially actuating the elements based on the elements' respective distances from the pump-out port, starting with the element that is farthest from the pump-out port.

13. The method of claim 12, further comprising repeating the selective actuating of the elements at least twice.

14. The method of claim 10, wherein the selective actuating is practiced before and/or during an evacuating process for the space.

15. The method of claim 10, wherein the plasma-generating elements are electrodes, the VIG unit subassembly being positioned both above and below the electrodes.

16. The method of claim 10, wherein the plasma-generating elements are substantially linear electrodes that are fixed in position relative to VIG unit subassembly.

17. The method of claim 16, wherein the electrodes are oriented relative to the VIG unit subassembly such that an acute angle is formed between edges of the electrodes closest to the pump-out port and an adjacent edge of the VIG unit subassembly to which the pump-out port is closest.

* * * * *